United States Patent [19]
Ringuet

[11] 3,843,910
[45] Oct. 22, 1974

[54] COOLING SYSTEM FOR COMPONENTS GENERATING LARGE AMOUNTS OF HEAT

[75] Inventor: Jacques Ringuet, Paris, France
[73] Assignee: Thomson-CSF, Paris, France
[22] Filed: Oct. 10, 1972
[21] Appl. No.: 296,177

[30] Foreign Application Priority Data
Oct. 18, 1971 France .............................. 71.37303

[52] U.S. Cl. ................................. 317/100, 165/107
[51] Int. Cl. ............................................ H05k 7/20
[58] Field of Search .......... 317/100, 234 A; 165/80, 165/107; 174/15 R, 16 R, DIG. 5

[56] References Cited
UNITED STATES PATENTS

| | | | |
|---|---|---|---|
| 3,387,648 | 6/1968 | Ward, Jr. | 174/15 R |
| 3,400,543 | 9/1968 | Ross | 174/15 R |
| 3,626,251 | 12/1971 | Vigue | 317/100 |
| 3,648,113 | 3/1972 | Rathjen | 174/15 R |

FOREIGN PATENTS OR APPLICATIONS

| | | | |
|---|---|---|---|
| 795,886 | 10/1968 | Canada | 317/100 |

Primary Examiner—Robert K. Schaefer
Assistant Examiner—Gerald P. Tolin
Attorney, Agent, or Firm—Karl F. Ross; Herbert Dubno

[57] ABSTRACT

A heavy duty cooling system utilizes air as a cooling fluid, the air being supplied at a suitable pressure in a main pipe which opens into a number of secondary pipes. Each secondary pipe terminates in a calibrated orifice which supplies a predetermined air flow to a component to be cooled. In the case where the components are arranged in groups, a secondary pipe opens through a calibrated conduit into a plenum chamber which distributes the air through calibrated openings formed in one of its walls to each of the components of the group. In order to increase the heat exchange, the area to be cooled is separated from the discharge opening by an expansion chamber into which the jet of fluid is directed.

13 Claims, 6 Drawing Figures

COOLING SYSTEM FOR COMPONENTS GENERATING LARGE AMOUNTS OF HEAT

BACKGROUND OF THE INVENTION

The present invention relates to improvements in cooling systems, particularly for components which generate large amounts of heat.

The term components is intended to cover elements of predetermined dimensions which may form an assembly and which, within the framework of the present invention, are the source of a certain development of heat energy which as to be dissipated, failing which there is a risk that these components would be destroyed or at any rate develop changes in their operation which would impair the general functioning of the system incorporating them. Consequently, such components have to be cooled by means of a fluid designed to absorb the developed heat energy.

The fluid may be air, either ambient air if the heat energy can be dissipated freely and adequately, or forced draft if the local conditions do not enable sufficiently intense and rapid cooling. This cooling can be carried out either in open-circuit or in closed-circuit fashion, using heat exchangers for example. The cooling fluid can also be a liquid which, circulating within the components or around them, heats up and releases the absorbed heat to a heat exchanger, for example, the latter cooling it sufficiently to enable it, during a fresh cooling cycle, to absorb the heat which the components have developed in the interim.

However, systems of this kind are not always adequate and in the case of a liquid, depending upon the installation of the components to be cooled and the risks of leakage, they can become complicated, bulky and therefore expensive.

This case can in particular arise where the number of components to be cooled is very large and where, moreover, they are small in size and are arrayed in groups.

Situations of this kind can arise in electronics where for example it is necessary to cool the phase-shift elements of a radiator array. The components which are to be cooled will for example be diodes arranged upon ceramic plates, these diodes developing considerable heat energy which must be evacuated.

The conventional cooling systems seem ill-suited to the problems posed by the dissipation of such heat, particularly as regards the installation of phase-shift elements in a radiator array, these elements being grouped in very large numbers at several locations whose accessibility and dismantling are often difficult, especially where hydraulic connections are involved.

SUMMARY OF THE INVENTION

In accordance with the invention, there is provided a cooling system for heat-generating components, in which a cooling fluid is supplied to the system through the medium of a blower fan and cooled in a heat exchanger, under the influence of an external fan, before flowing through a main pipe which open into a multiplicity of secondary pipes or circuits each of these secondary circuits terminating in a calibrated passage which allows a predetermined flow rate of fluid to pass; this fluid acts directly upon a component or indirectly upon a group of components by way of a fluid-distribution box or plenum chamber.

BRIEF DESCRIPTION OF THE DRAWING

The invention will be more readily understood in connection with the following description of illustrative embodiments given with reference to the accompanying drawing in which.

SPECIFIC DESCRIPTION

Figure 1:
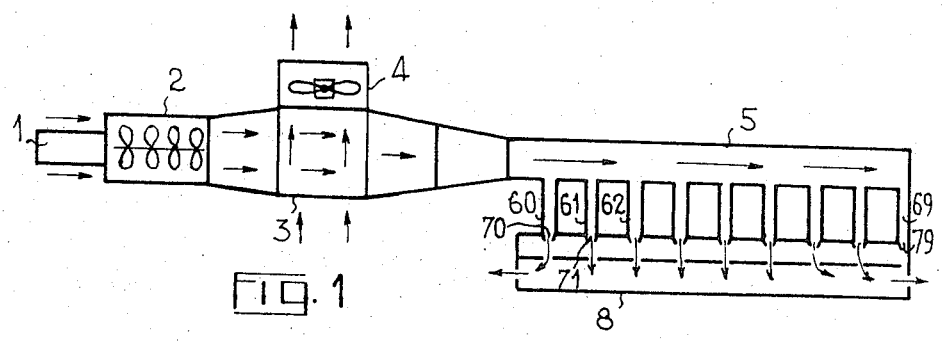
FIG. 1 is a schematic view of a cooling system in accordance with the invention operating in the form of an open-circuit arrangement.

FIG. 1 schematically illustrates a cooling system in accordance with the invention, that is to say one designed to dissipate heat generated at a high rate, e.g. on perphaps in the order of 5W per $mm^2$, and designed also to take into account the installation of the components being cooled, which may be quite numerous especially in the context of the electronic devices mentioned above. In the example of FIG. 1, the cooling fluid is air and the system operates, in an open circuit at atmospheric pressure. This system comprises an air intake 1 followed by a fan 2 acting as a blower to maintain the interior of the apparatus under pressure and to compensate inter alia for the pressure losses while supplying the required air flow. The air leaving the fan 2 passes through a heat exchanger 3 where it is cooled by the action of an external fan 4 generating a cross-flow of ambient air. The cooled air leaving the exchanger outlet reaches a pipe 5 which transports it to the location where cooling is to take place. To do so, in accordance with the invention, the main pipe or supply manifold 5 opens into a multiplicty of branch pipes 6, or secondary fluid cicuits, some of which have been designated 60 to 69. The number of these secondary circuits depends on the number of componets to be cooled and, in some instances it is advantageous to have a separate branch circuit 60 69 to feed each component.

In this case, each secondary circuit has a discharge opening formed by a nozzle or injector 70 to 79 confronting the respective component as described in more detail hereinafter.

The spent air, which has been used to cool the components and has therefore heated up, is collected in a discharge pipe 8. In the embodiment shown in FIG. 1, this pipe opens directly to the atmosphere.

Figure 2:
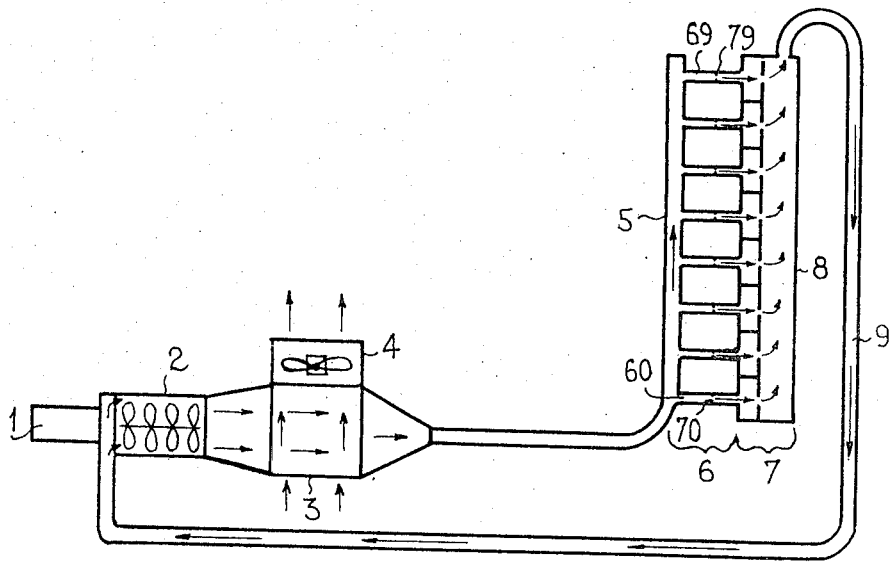
FIG. 2 shows a modification of the embodiment of FIG. 1, operating a closed circuit.

FIG. 2 illustrates a device similar to that of FIG. 1 but operating in a pressurized closed circuit.

All the elements and circuits of FIG. 2 which have counterparts in FIG. 1, are designated by the same references. The two embodiments therefore exhibit numerous similarities. However, the secondary pipe 8, collecting the air heated in contact with the components being cooled, opens into another pipe 9 which returns the heated air to the input of the device, that is to say to the blower fan 2.

Figure 3:
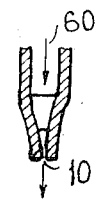
FIG. 3 is a schematic view of an injector forming part of a system of FIGS. 1 or 2.

FIG. 3 illustrates details of the injector. Or nozzle 60 located at one end of a secondary circuit, at the point where the latter opens onto a component which is to be cooled.

This injector is fixed by suitable means, and in a manner known per se, to the end of the secondary circuit and its orifice 10 is calibrated in order to match its air flow, to the heat development of the corresponding component. Generally, the injector will be located opposite the component being cooled. According to an important feature of the invention, the number of secondary circuits is reduced with reference to the number of components to be cooled, especially where the components are very numerous, as for example in the electronic system of a reflector array which comprises a very large number of phase-shift elements, and where the components are arrayed in several groups.

In this case, the secondary circuits do not terminate at the injectors but, still calibrated, open into air distribution boxes or plenum chambers.

Figure 4:
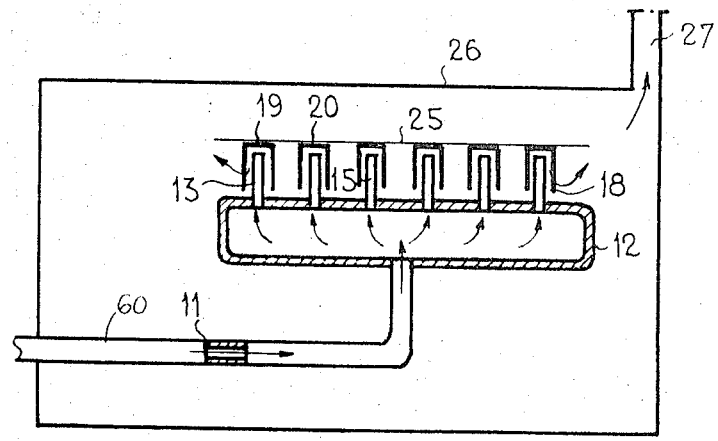
FIG. 4 is a schematic view of a distribution box for a cooling fluid in an alternate embodiment.

FIG. 4 illustrates this kind of arrangement. A secondary circuit 60, for example, is provided to this end with a calibrated constriction 11 to regulate the air flow passing into an air-distribution box 12. In a wall of this box, injectors 13 to 18 are distributed which are associated in each case with one of the components 19 to 24 being cooled, these latter being grouped for example upon a plate 25. The array of components and the air-distribution box are arranged in an enclosure 26, generally under pressure, and the air heated by the components being cooled escapes from enclosure 26 through an exit pipe 27 connected to the return pipe 9 visible in FIG. 2.

Figure 5:
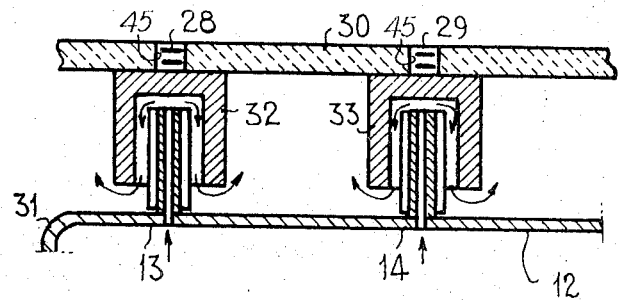
FIG. 5 is a schematic view of a component associated with a flow spreader in an embodiment similar to that of FIG. 4

FIG. 5 illustrates a detail of a mounting for a group of components to be cooled by to the air distribution box of FIG. 4.

The components to be cooled, which in the example of the aforementioned reflective antenna array, are diodes 28, 29, are arranged upon a ceramic supporting plate 30. The wall of the distribution box 12, in which the injectors 13 and 14 are fixed, is marked 31. The injectors 13, 14 are directed straight onto the components to be cooled. However, in order to improve cooling, the heat-exchange area of the component exposed to the oncoming air stream is increased. by means of a flow spreader in the form of a cup-shaped receptacle 32, 33 of a material having good thermal conductivity which is attached, preferably by soldering, to the component. This cup has a generally cylindrical form and the corresponding injector, e.g. nozzle 13, penetrates into it. The air expelled by the injector 13 strikes the base of the cup 32 and leaves same by flowing over its walls, in the manner indicated by the arrows in the drawing. The cooling of the component 28 or 29, mounted in apertures 45 each overlying the end wall of a respective receptacle 28 or 29, is thus achieved by forced convection. In the case of electronic components, diodes in the example described above, the injector which penetrates into the cup lies 1 to 2 mm from the lateral walls and the base. The injector is coated with an electrical insulator in this case.

Figure 6:
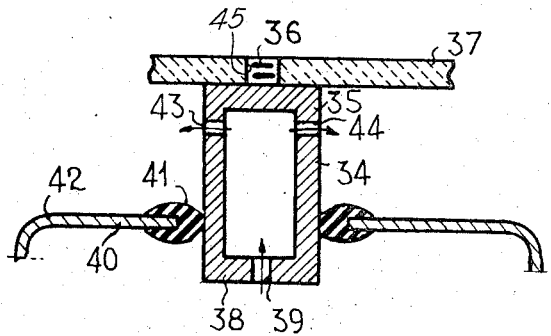
FIG. 6 shows a modification of the embodiment of FIG. 5.

FIG. 6 shows a receptacle 34 in which the injector has been formed by machining.

The receptacle 34 is no longer an open-ended cylinder as in FIG. 5, but takes the form of a closed cylindrical chamber.

To one of the end walls 35 of this receptacle 34a component 36 is fixed, this component itself being attached to a plate 37. In the other, partly closed end wall 38, facing the wall 35, a calibrated orifice 39 is machined to provide communication with the air-distribution box.

In this case, the receptacle projects into the plenum chamber 40 and the wall 42 of the latter abuts against the lateral walls of the receptacle 34 through the intermediary of a flexible seal 41 of insulating material. Lateral parts 43 and 44, serving to discharge the air heated in contact with the component being cooled, are provided in the lateral walls of the receptacle. This construction makes it possible to achieve supplementary cooling thanks to the effect of expansion of the air in the chamber 34.

What is claimed is:

1. In combination, a multiplicty of heat-generating electronic components, arrayed in a plurality of groups, and a cooling system for dissipating the generated heat, said cooling system comprising:

a heat exchanger provided with an inlet and an outlet for a gaseous fluid, blower means for driving said fluid, and cooling means for said fluid between said inlet and said outlet;

a supply manifold connected to said outlet for receiving said fluid therefrom;

a plurality of branch conduits extending from said supply manifold; and a separate plenum chamber connected to each of said branch conduits and juxtaposed with a respective group of said components, each plenum chamber being provided with a multiplicity of calibrated discharge openings individually confronting the components of said group for training a cooling flow upon same.

2. The combination defined in claim 1 wherein said fluid is air.

3. The combination defined in claim 1 wherein said heat exchanger includes an external cross-flow fan for transferring heat from said fluid to ambient air.

4. The combination defined in claim 1, further comprising an enclosure surrounding said group of components and said plenum chamber, said enclosure being provided with an exit for spent fluid.

5. The combination defined in claim 4, further comprising a return conduit extending from said exit to said inlet.

6. The combination defined in claim 1 wherein said branch conduits are provided with calibrated constrictions.

7. The combination defined in claim 1 wherein said group of components are provided with a common support, further comprising a plurality of receptacles of thermally conductive material communicating with respective discharge openings of said plenum chamber, said receptacles having end walls in contact with said support and interposed between said discharge openings and confronting components.

8. The combination defined in claim 7 wherein the interiors of said receptacles are substantially wider than said discharge openings, thereby enabling said fluid to spread along the inner wall surfaces thereof.

9. The combination defined in claim 8 wherein said receptacles are generally cup-shaped with open ends opposite said end walls, said discharge openings being formed by nozzles spacedly extending through said open ends toward said end walls.

10. The combination defined in claim 8 wherein said receptacles are substantially cylindrical with partly closed ends opposite said end walls formed with said discharge openings and with lateral ports for the escape of spent fluid.

11. The combination defined in claim 10 wherein said receptacles project into said plenum chamber at said partly closed ends.

12. The combination defined in claim 11, further comprising insulating seal means supporting said receptacles in a wall of said plenum chamber.

13. The combination defined in claim 7 wherein said support is a ceramic plate, said components being diodes carried in apertures of said plate overlying said end walls.

* * * * *